US011562496B2

(12) United States Patent
Liu

(10) Patent No.: US 11,562,496 B2
(45) Date of Patent: Jan. 24, 2023

(54) DEPTH IMAGE PROCESSING METHOD, DEPTH IMAGE PROCESSING APPARATUS AND ELECTRONIC DEVICE

(71) Applicant: GUANGDONG OPPO MOBILE TELECOMMUNICATIONS CORP., LTD., Dongguan (CN)

(72) Inventor: Chang Liu, Yokohama (JP)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/245,489

(22) Filed: Apr. 30, 2021

(65) Prior Publication Data
US 2021/0248767 A1 Aug. 12, 2021

Related U.S. Application Data

(63) Continuation of application No. PCT/CN2018/113584, filed on Nov. 2, 2018.

(51) Int. Cl.
*H04N 13/02* (2006.01)
*G06T 7/55* (2017.01)
(Continued)

(52) U.S. Cl.
CPC ............... *G06T 7/55* (2017.01); *G01S 17/42* (2013.01); *G01S 17/894* (2020.01); *G06T 5/002* (2013.01);
(Continued)

(58) Field of Classification Search
CPC .................... H04N 13/128; H04N 5/23229
See application file for complete search history.

(56) References Cited

U.S. PATENT DOCUMENTS 7,911,513 B2 3/2011 Garrison et al.
8,989,517 B2 3/2015 Morgan-Mar et al.
(Continued)

FOREIGN PATENT DOCUMENTS

CN 105227838 A 1/2016
CN 106993091 A 7/2017
(Continued)

OTHER PUBLICATIONS

Kang, et al. "Intelligent autofocus with adaptive depth of field." 2015 14th IAPR International Conference on Machine Vision Applications (MVA). IEEE (Year: 2015).*
(Continued)

*Primary Examiner* — Fabio S Lima
(74) *Attorney, Agent, or Firm* — Sheppard, Mullin, Richter & Hampton LLP

(57) ABSTRACT

Disclosed are a depth image processing method, a depth image processing apparatus (10), and an electronic device (100). The depth image processing method is applied in the electronic device (100) including a depth image capturing apparatus (20) configured to capture an initial depth image. The depth image processing method includes: obtaining (01) target depth data for a number of regions of interest of the initial depth image; determining (02) whether the number of regions of interest is greater than a predetermined value; grouping (03), in response to the number of regions of interest being greater than the predetermined value, the number of regions of interest based on the target depth data to obtain a target depth of field; obtaining (04) a target blurring intensity based on the target depth of field; and blurring (05) the initial depth image based on the target blurring intensity to obtain a blurred depth image.

14 Claims, 15 Drawing Sheets

(51) Int. Cl.
*G06T 7/521* (2017.01)
*G01S 17/894* (2020.01)
*G01S 17/42* (2006.01)
*G06T 5/00* (2006.01)

(52) U.S. Cl.
CPC .... *G06T 7/521* (2017.01); *G06T 2207/10028* (2013.01)

(56) References Cited

U.S. PATENT DOCUMENTS

| | | | |
|---|---|---|---|
| 9,025,874 B2 | 5/2015 | Fransson et al. | |
| 9,547,160 B2 | 1/2017 | Laroia et al. | |
| 10,237,530 B1* | 3/2019 | Brailovskiy | H04N 13/156 |
| 2004/0076335 A1 | 4/2004 | Kim | |
| 2013/0250144 A1* | 9/2013 | Takayama | G02B 21/367 |
| | | | 348/239 |
| 2014/0233853 A1 | 8/2014 | Fransson et al. | |
| 2020/0065986 A1* | 2/2020 | Chen | H04N 5/265 |
| 2020/0068184 A1* | 2/2020 | Shadik | H04N 13/128 |
| 2020/0107710 A1* | 4/2020 | Duckett, III | A61B 1/00105 |

FOREIGN PATENT DOCUMENTS

| | | | |
|---|---|---|---|
| CN | 107172346 A | | 9/2017 |
| CN | 107454328 A | | 12/2017 |
| CN | 107592466 A | * | 1/2018 |
| CN | 107592466 A | | 1/2018 |
| CN | 108053363 A | | 5/2018 |
| EP | 2768213 A1 | | 8/2014 |
| JP | 2018005008 A | | 1/2018 |

OTHER PUBLICATIONS

Extended European Search Report dated Nov. 3, 2021 received in European Patent Application No. EP 18938296.3.
Lee, Pei-Jun et al: "Nongeometric Distortion Smoothing Approach for Depth Map Preprocessing", IEEE Transactions on Multimedia, IEEE Service Center, US, vol. 13, No. 2, Apr. 1, 2011(Apr. 1, 2011), pp. 246-254, XP011363647, ISSN: 1520-9210, DOI: 10. 1109/ TMM. 2010. 2100372.
First Office Action from Chinese Application No. 201880098758.X, dated Feb. 7, 2022. English translation attached.
International Search Report and Written Opinion dated May 7, 2020 in International Application No. PCT/CN2018/113584. English translation attached.

* cited by examiner

DEPTH IMAGE PROCESSING METHOD, DEPTH IMAGE PROCESSING APPARATUS AND ELECTRONIC DEVICE

CROSS-REFERENCE TO RELATED APPLICATION

The present application is a continuation of International Application No. PCT/CN2018/113584, filed on Nov. 2, 2018, which is hereby incorporated by reference in its entirety.

TECHNICAL FIELD

The present disclosure relates to the field of image processing technologies, and more particularly, to a depth image processing method, a depth image processing apparatus, and an electronic device.

BACKGROUND

Cameras in smartphones are becoming more and more popular, and blurring is a common way of taking pictures with cameras. Currently, a blurring method is to define a depth of field according to a subject, and then blur the part outside the range of the depth of field. However, when a number of people or a group of people are photographed at the same time, only a portrait of the subject can be kept clear and other parts will be blurred out, resulting in a poor user experience.

SUMMARY

The present disclosure provides a depth image processing method, a depth image processing apparatus, and an electronic device.

According to an embodiment of the present disclosure, a depth image processing method is provided. The depth image processing method is applied in an electronic device including a depth image capturing apparatus configured to capture an initial depth image. The depth image processing method includes: obtaining target depth data for a number of regions of interest of the initial depth image; determining whether the number of regions of interest is greater than a predetermined value; grouping, in response to the number of regions of interest being greater than the predetermined value, the number of regions of interest based on the target depth data to obtain a target depth of field; obtaining a target blurring intensity based on the target depth of field; and blurring the initial depth image based on the target blurring intensity to obtain a blurred depth image.

According to an embodiment of the present disclosure, a depth image processing apparatus is provided. The depth image processing apparatus is applied in an electronic device including a depth image capturing apparatus configured to capture an initial depth image. The depth image processing apparatus includes: a first obtaining module configured to obtain target depth data for a number of regions of interest of the initial depth image; a first determining module configured to determine whether the number of regions of interest is greater than a predetermined value; a second obtaining module configured to group, in response to the number of regions of interest being greater than the predetermined value, the number of regions of interest based on the target depth data to obtain a target depth of field; a third obtaining module configured to obtain a target blurring intensity based on the target depth of field; and a processing module configured to blur the initial depth image based on the target blurring intensity to obtain a blurred depth image.

According to an embodiment of the present disclosure, an electronic device is provided. The electronic device includes a depth image capturing apparatus configured to capture an initial depth image and a processor configured to: obtain target depth data for a number of regions of interest of the initial depth image; determine whether the number of regions of interest is greater than a predetermined value; group, in response to the number of regions of interest being greater than the predetermined value, the number of regions of interest based on the target depth data to obtain a target depth of field; obtain a target blurring intensity based on the target depth of field; and blur the initial depth image based on the target blurring intensity to obtain a blurred depth image.

With the depth image processing method, depth image processing apparatus, and electronic device according to the embodiments of the present disclosure, in response to a number of regions of interest being greater than a predetermined value, the number of regions of interest are grouped based on their target depth data to obtain a target depth of field, such that an initial depth image can be blurred based on a target blurring intensity obtained based on the target depth of field. In this way, a better user experience can be provided when a number of people or a group of people are photographed.

Additional aspects and advantages of the present disclosure will be given at least in part in the following description, or become apparent at least in part from the following description, or can be learned from practicing of the present disclosure.

BRIEF DESCRIPTION OF DRAWINGS

The above and/or additional aspects and advantages of the present disclosure will become more apparent and easier to understand from the description of embodiments taken in conjunction with the following figures.

DESCRIPTION OF EMBODIMENTS

Figure 1:
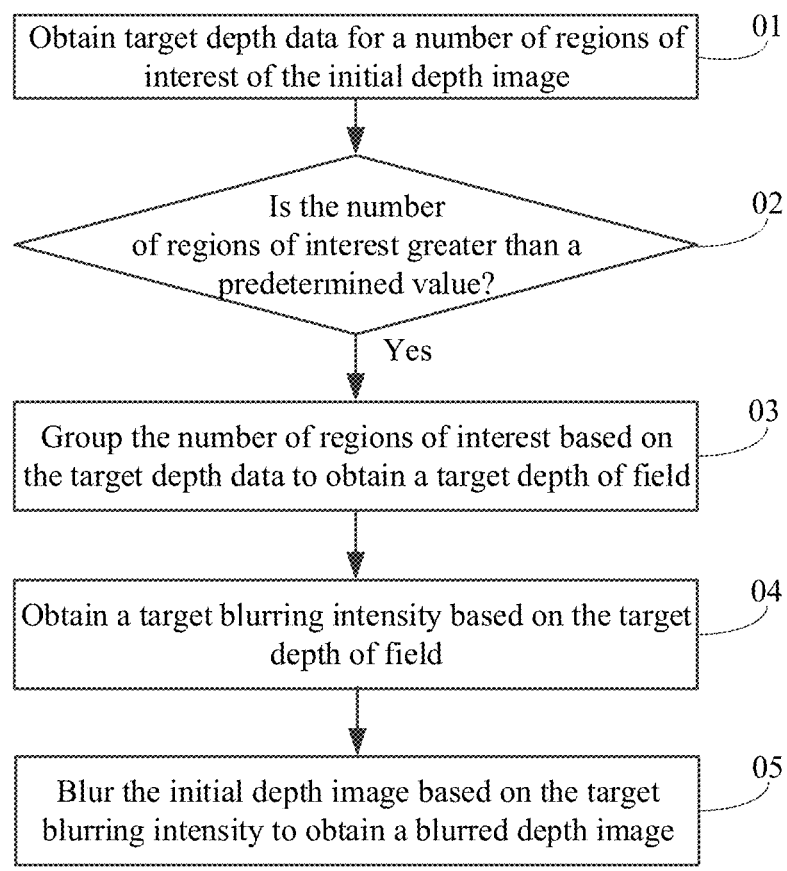
FIG. 1 is a flowchart illustrating a depth image processing method according to some embodiments of the present disclosure.
Figure 2:
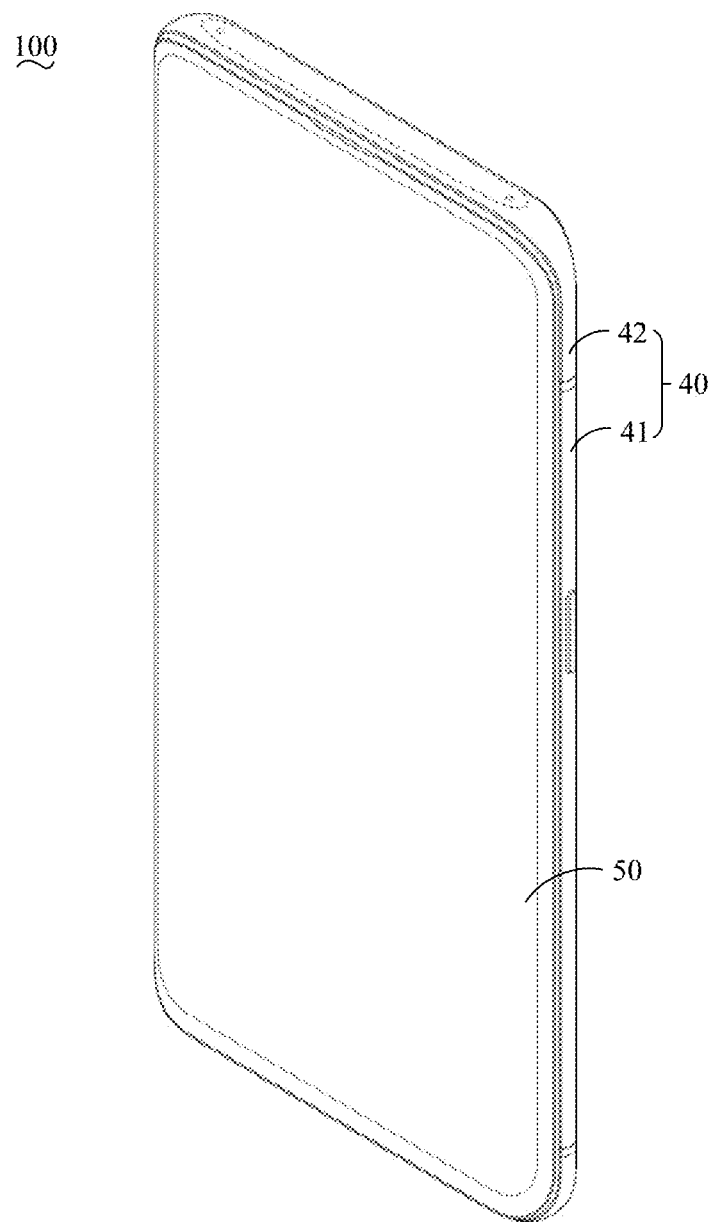
FIG. 2 is a schematic diagram illustrating a stereoscopic structure of an electronic device in a state according to some embodiments of the present disclosure.
Figure 3:
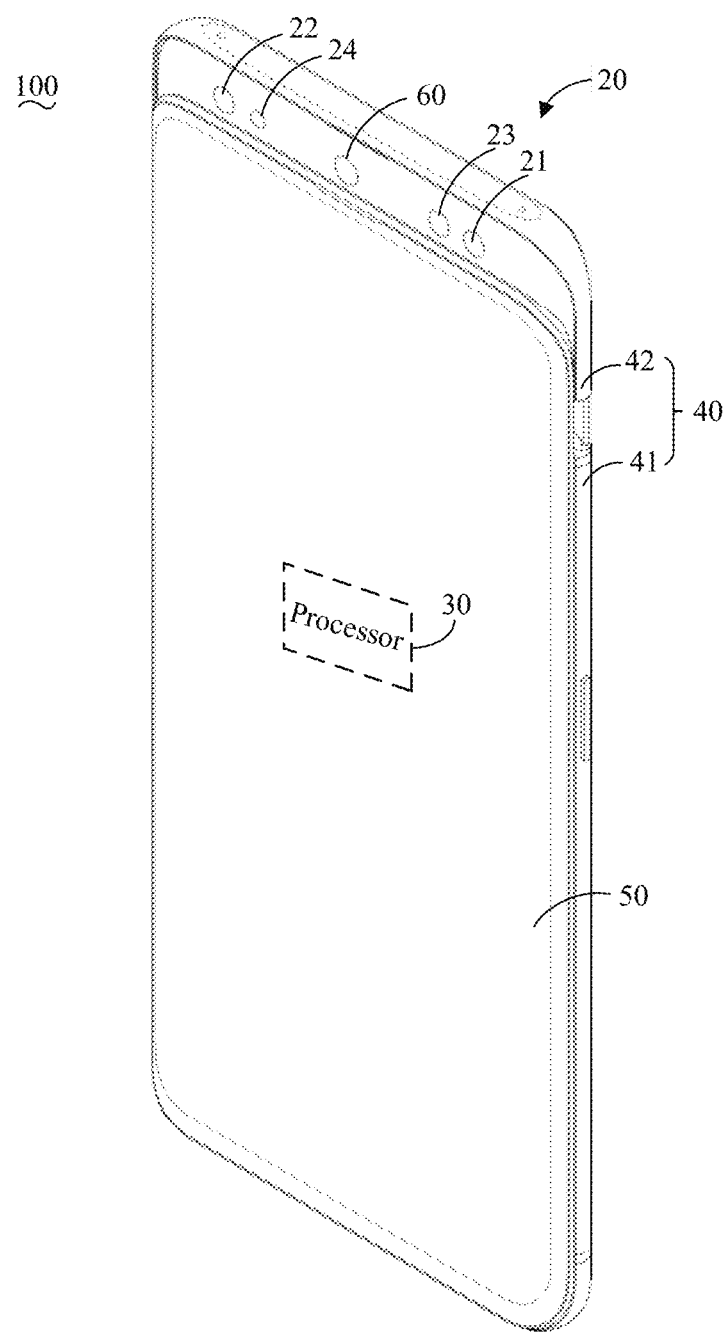
FIG. 3 is a schematic diagram illustrating a stereoscopic structure of an electronic device in another state according to some embodiments of the present disclosure.

Referring now to FIGS. 1 to 3, a depth image processing method according to an embodiment of the present disclosure is applied in an electronic device 100. The electronic device 100 includes a depth image capturing apparatus 20. The depth image capturing apparatus 20 is configured to capture an initial depth image. The depth image processing method includes:

01: obtaining target depth data for a number of regions of interest of the initial depth image;

02: determining whether the number of regions of interest is greater than a predetermined value;

03: grouping, in response to the number of regions of interest being greater than the predetermined value, the number of regions of interest based on the target depth data to obtain a target depth of field;

04: obtaining a target blurring intensity based on the target depth of field; and 05: blurring the initial depth image based on the target blurring intensity to obtain a blurred depth image.

Figure 4:
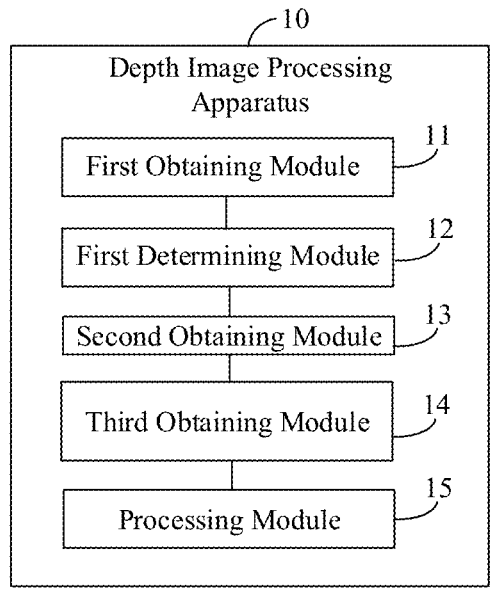
FIG. 4 is a block diagram of a depth image processing apparatus according to some embodiments of the present disclosure.

Referring to FIG. 4, a depth image processing apparatus 10 according to an embodiment of the present disclosure is applied in an electronic device 100. The electronic device 100 includes a depth image capturing apparatus 20. The depth image capturing apparatus 20 is configured to capture an initial depth image. The depth image processing apparatus 10 includes a first obtaining module 11, a first determining module 12, a second obtaining module 13, a third obtaining module 14, and a processing module 15. The depth image processing method according to the embodiment of the present disclosure can be implemented by the depth image processing apparatus 10 according to the embodiment of the present disclosure. For example, the first obtaining module 11 can be configured to perform the method in 01, the first determining module 12 can be configured to perform the method in 02, the second obtaining module 13 can be configured to perform the method in 03, the third obtaining module 14 can be configured to perform the method in 04, and the processing module 15 can be configured to perform the method in 05. In other words, the first obtaining module 11 can be configured to obtain target depth data for a number of regions of interest of the initial depth image. The first determining module 12 can be configured to determine whether the number of regions of interest is greater than a predetermined value. The second obtaining module 13 can be configured to group, in response to the number of regions of interest being greater than the predetermined value, the number of regions of interest based on the target depth data to obtain a target depth of field. The third obtaining module 14 can be configured to obtain a target blurring intensity based on the target depth of field. The processing module 15 can be configured to blur the initial depth image based on the target blurring intensity to obtain a blurred depth image.

Referring back to FIG. 3, an electronic device 100 according to an embodiment of the present disclosure includes a depth image capturing apparatus 20 and a processor 30. The depth image capturing apparatus 20 is configured to capture an initial depth image. The depth image processing method according to the embodiment of the present disclosure can be implemented by the electronic device 100 according to the embodiment of the present disclosure. For example, the processor 30 can be configured to perform the methods in 01, 02, 03, 04, and 05. In other words, the processor 30 can be configured to: obtain target depth data for a number of regions of interest of the initial depth image; determine whether the number of regions of interest is greater than a predetermined value; group, in response to the number of regions of interest being greater than the predetermined value, the number of regions of interest based on the target depth data to obtain a target depth of field; obtain a target blurring intensity based on the target depth of field; and blur the initial depth image based on the target blurring intensity to obtain a blurred depth image.

In particular, the electronic device 100 may be a mobile phone, a tablet computer, a game console, a smart watch, a head-mounted display device, a drone, etc. The embodiments of the present disclosure will be described with reference to an example where the electronic device 100 is for example a mobile phone. It can be appreciated that the specific form of the electronic device 100 is not limited to a mobile phone.

Referring to FIG. 2 and FIG. 3, the electronic device 100 includes a casing 40. The casing 40 can be used as a mounting carrier for functional elements of the electronic device 100. The casing 40 can provide protection against dust, water, and drop for the functional elements. The functional elements may include a display screen 50, an earphone 60, etc., and may further include the depth image capturing apparatus 20. The depth image capturing apparatus 20 may include any one or more of a binocular camera (including a first camera 21 and a second camera 22), a Time-of-Flight (TOF) depth camera 23, or a structured light depth camera 24. In an embodiment of the present disclosure, the casing 40 may include a main body 41 and a movable bracket 42. The movable bracket 42 can move with respect to the main body 41 when driven by a driving apparatus. For example, the movable bracket 42 can slide with respect to the main body 41, so as to slide into the main body 41 (as shown in FIG. 2) or slide out of the main body 41 (as shown in FIG. 3). Some of the functional elements (such as the display screen 50) can be mounted on the main body 41, and others (such as the earphone 60 and the depth image capturing apparatus 20) can be mounted on the movable bracket 42 and may retract into the main body 41 or protrude from the main body 41 as the movable bracket 42 moves. Of course, FIGS. 2 and 3 only show an example of a specific form of the casing 40, and should not be understood as limiting the casing 40 of the present disclosure.

The depth image capturing apparatus 20 can be mounted on the casing 40. In particular, the depth image capturing apparatus 20 can be mounted on the movable bracket 42. When a user needs to use the depth image capturing apparatus 20 to capture a depth image, he/she can trigger the movable bracket 42 to slide out of the main body 41 to drive the depth image capturing apparatus 20 to protrude from the main body 41. When the depth image capturing apparatus 20 is not needed, the movable bracket 42 can be triggered to slide into the main body 41 to drive the depth image capturing apparatus 20 to retract into the main body 41. In another embodiment, a light through hole (not shown) may be provided on the casing 40, and the depth image capturing apparatus 20 can be arranged immovably in the casing 40 and match the light through hole to capture a depth image. Alternatively, the display screen 50 may be provided with a light through hole (not shown), and the depth image capturing apparatus 20 can be arranged beneath the display screen 50 and match the light through hole to capture a depth image.

Figure 5:
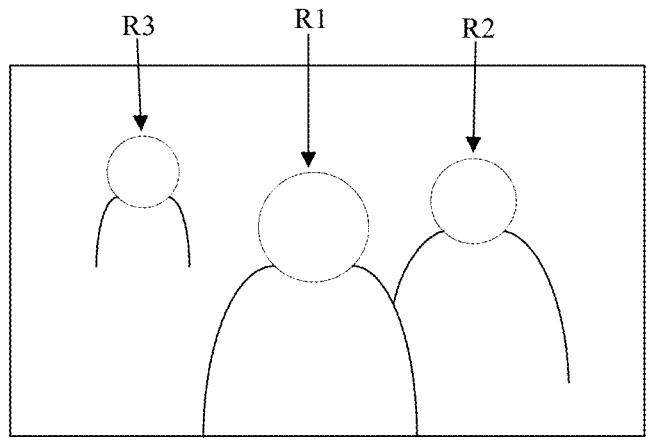
FIG. 5 is a schematic diagram illustrating a scenario for a depth image processing method according to some embodiments of the present disclosure.

When performing the depth image processing method according to the embodiment of the present disclosure, the processor 30 obtains target depth data for a number of regions of interest from an initial depth image. Each region of interest can be a focus region in the image. Each region of interest can be a region set or selected by the user in advance, such as a flower, a tree, or any other object selected by the user. The region of interest can alternatively be a human face region. The number of regions of interest may be one or more. For example, when a group or a number of people are photographed, each portrait region can be a region of interest. In FIG. 5, the number of regions of interest is three: R1, R2, and R3. When photographing, the regions R1, R2, and R3 are to be kept clear, while regions other than R1, R2, and R3 exhibit a certain blurring effect. The target depth data of the regions R1, R2, and R3 obtained by the processor 30 may be D1, D2, and D3, respectively, where D1<D2<D3, that is, the distances between respective subjects corresponding to the regions R1, R2, and R3 and the image capturing apparatus 20 increase sequentially.

The processor 30 further determines whether the number of regions of interest is greater than a predetermined value. In particular, the predetermined value may be 1. In other words, in response to there being two or more regions of interest, the number of regions of interest is greater than the predetermined value.

In response to the number of regions of interest being greater than the predetermined value, the processor 30 groups the number of regions of interest based on the target depth data to obtain a target depth of field. In the example shown in FIG. 5, the number of regions of interest is 3, which is greater than the predetermined value 1, the processor 30 can group the regions R1, R2, and R3 based on respective values of D1, D2, and D3. In particular, the processor 30 can group the regions of interest with adjacent target depth data in an ascending order of the target depth data. For example, the processor 30 may first determine R1 and R2 as a group, obtain a depth of field D12, then determine the group (R1, R2) and R3 as a group and obtain a depth of field D123, and finally determine the target depth of field based on the obtained depth of field D123, and then determine a target blurring intensity and blur the initial depth image based on the target blurring intensity to obtain a blurred depth image. Similarly, when the number of regions of interest is 4 or more, for example, when the regions of interest are R1, R2, R3, and R4, the processor 30 may first determine R1 and R2 as a group, obtain a depth of field D12, then determine the group (R1, R2) and R3 as a group and obtain a depth of field D123, and finally determine the group (R1, R2, R3) and R4 as a group and obtain a depth of field D1234. Of course, in another embodiment, the processor 30 can group the regions of interest with adjacent target depth data in a descending order of the target depth data. For example, when the number of regions of interest is three, the processor 30 may first determine R3 and R2 as a group, obtain a depth of field D32, and then determine the group (R3, R2) and R1 as a group and obtain a depth of field D321.

It can be appreciated that when the number of regions of interest is smaller than or equal to the predetermined value, for example, when one single person is photographed, the number of regions of interest is 1, and the processor 30 does not need to group the regions of interest based on the target depth data. Instead, the processor 30 can simply obtain the target depth of field directly based on the region of interest, then determine the target blurring intensity, and blur the initial depth image based on the target blurring intensity to obtain the blurred depth image.

With the depth image processing method, the depth image processing apparatus 10, and the electronic device 100 according to the embodiments of the present disclosure, in response to the number of regions of interest being greater than the predetermined value, the number of regions of interest are grouped based on the target depth data of the respective regions of interest to obtain the target depth of field, rather than considering the target depth data of only one region of interest to determine the target depth of field corresponding to the one region of interest. In this way, it can be ensured that each of the number of regions of interest will be clear, so as to provide a better user experience when a number of people or a group of people are photographed.

Figure 6:
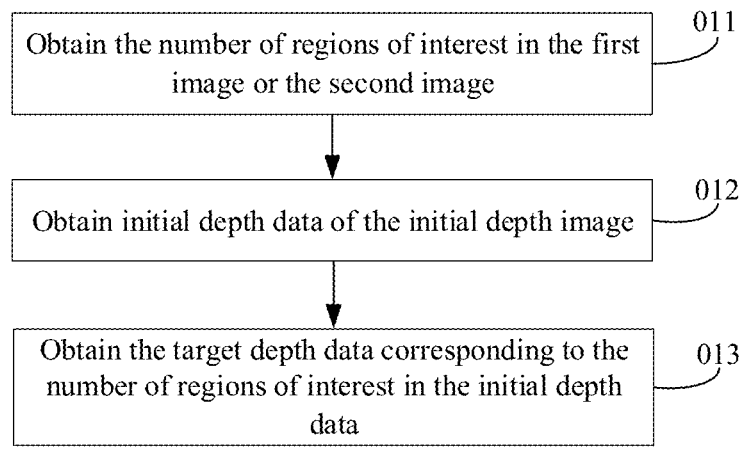
FIG. 6 is a flowchart illustrating a depth image processing method according to some embodiments of the present disclosure.
Figure 7:
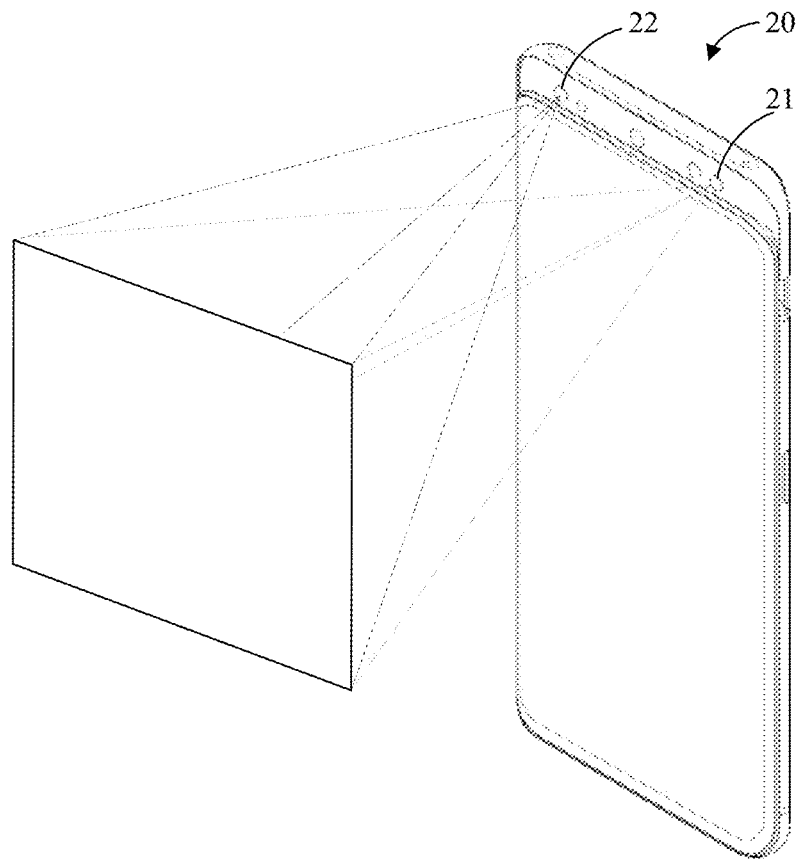
FIG. 7 is a schematic diagram illustrating a scenario for a depth image processing method according to some embodiments of the present disclosure.

Referring to FIGS. 6 and 7, in some embodiments, the depth image capturing apparatus 20 can include a first camera 21 and a second camera 22. The first camera 21 is configured to capture a first image. The second camera 22 is configured to capture a second image. The first image and the second image are combined to form the initial depth image. The operation (i.e., 01) of obtaining the target depth data for the number of regions of interest of the initial depth image may include:

011: obtaining the number of regions of interest in the first image or the second image;

012: obtaining initial depth data of the initial depth image; and

013: obtaining the target depth data corresponding to the number of regions of interest in the initial depth data.

Figure 8:
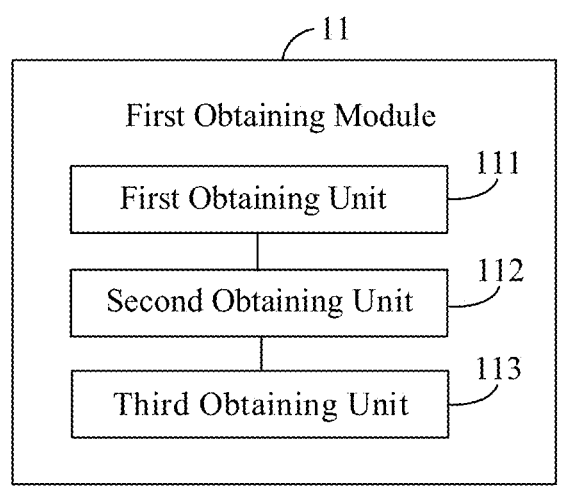
FIG. 8 is a block diagram of a first obtaining module according to some embodiments of the present disclosure.

Referring to FIG. 8, in some embodiments, the depth image capturing apparatus 20 includes a first camera 21 and a second camera 22. The first camera 21 is configured to capture a first image. The second camera 22 is configured to capture a second image. The first image and the second image are combined to form the initial depth image. The first obtaining module 11 includes a first obtaining unit 111, a second obtaining unit 112, and a third obtaining unit 113. The first obtaining unit 111 can be configured to perform the method in 011, the second obtaining unit 112 can be configured to perform the method in 012, and the third obtaining unit 113 can be configured to perform the method in 013. In other words, the first obtaining unit 111 can be configured to obtain the number of regions of interest in the first image or the second image. The second obtaining unit 112 can be configured to obtain initial depth data of the initial depth image. The third obtaining unit 13 can be configured to obtain the target depth data corresponding to the number of regions of interest in the initial depth data.

Referring back to FIG. 7, in some embodiments, the depth image capturing apparatus 20 can include a first camera 21 and a second camera 22. The first camera 21 is configured to capture a first image. The second camera 22 is configured to capture a second image. The first image and the second image are combined to form the initial depth image. The processor 30 can be configured to perform the methods in 011, 012, and 013. In other words, the processor 30 can be configured to obtain the number of regions of interest in the first image or the second image; obtain initial depth data of the initial depth image; and obtain the target depth data corresponding to the number of regions of interest in the initial depth data.

In particular, the first camera 21 and the second camera 22 can be RGB cameras. The first camera 21 and the second camera 22 can photograph a same scene from two different angles to obtain the first image and the second image, respectively, so as to form the initial depth image with depth information.

In an embodiment of the present disclosure, the first camera 21 and the second camera 22 may both be visible light cameras. In this case, the first image and the second image may both be visible light images. Alternatively, the first camera 21 may be an infrared camera, and the second camera 22 may be a visible light camera. In this case, the first image may be an infrared light image, and the second image may be a visible light image. Alternatively, the first camera 21 may be a visible light camera, and the second camera 22 may be an infrared camera. In this case, the first image may be a visible light image, and the second image may be an infrared light image. Of course, the first camera 21 and the second camera 22 may alternatively be other types of cameras, and the first image and the second image may be images of corresponding types, and the present disclosure is not limited to any of these examples. Each region of interest may be an image region in the first image or the second image. The processor 30 can use an image identification algorithm to determine whether there is a region of interest in the first image or the second image, and determine a position of the region of interest, i.e., a range of horizontal and vertical coordinates of pixels for the region of interest in the first image or the second image. The processor 30 can obtain the initial depth data of the entire initial depth image. Since the first image or the second image and the initial depth image are registered and aligned and have a certain correspondence, the processor 30 can search the initial depth data for the target depth data corresponding to the region of interest. It is to be noted that 011 and 012 can be performed in any order. For example, 011 can be performed before, after, or in parallel with 012.

Figure 9:
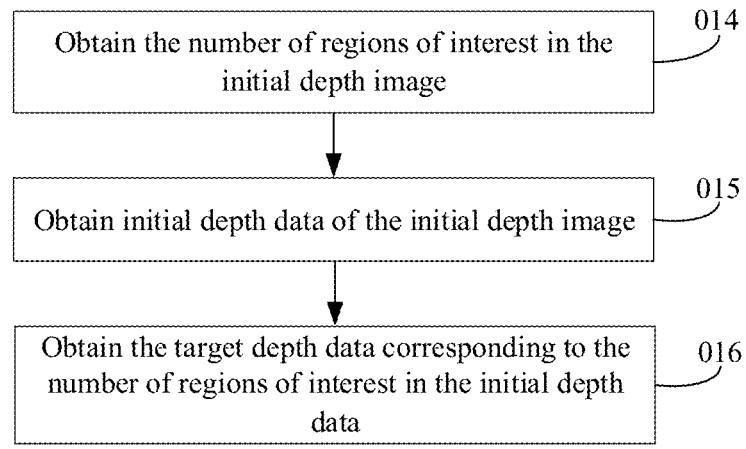
FIG. 9 is a flowchart illustrating a depth image processing method according to some embodiments of the present disclosure.

Referring to FIGS. 3 and 9, in some embodiments, the depth image capturing apparatus 20 can include a Time-of-Flight (TOF) depth camera 23. The operation (i.e., 01) of obtaining the target depth data for the number of regions of interest of the initial depth image may include:

014: obtaining the number of regions of interest in the initial depth image;

015: obtaining initial depth data of the initial depth image; and

016: obtaining the target depth data corresponding to the number of regions of interest in the initial depth data.

Figure 10:
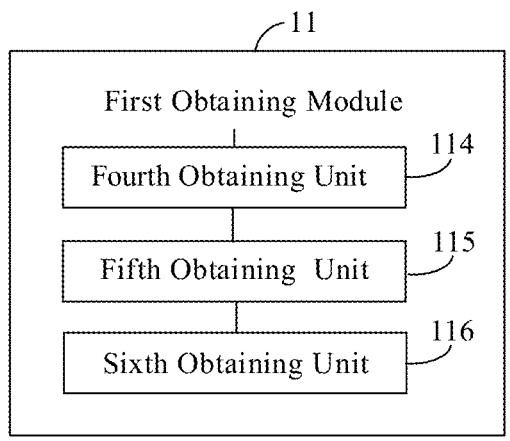
FIG. 10 is a block diagram of a first obtaining module according to some embodiments of the present disclosure.

Referring to FIG. 10, in some embodiments, the depth image capturing apparatus 20 can include a TOF depth camera 23. The first obtaining module 11 can include a fourth obtaining unit 114, a fifth obtaining unit 115, and a sixth obtaining unit 116. The fourth obtaining unit 114 can be configured to perform the method in 014, the fifth obtaining unit 115 can be configured to perform the method in 015, and the sixth obtaining unit 116 can be configured to perform the method in 016. In other words, the fourth obtaining unit 114 can be configured to obtain the number of regions of interest in the initial depth image. The fifth obtaining unit 115 can be configured to obtain initial depth data of the initial depth image. The sixth obtaining unit 116 can be configured to obtain the target depth data corresponding to the number of regions of interest in the initial depth data.

Referring to FIG. 3, in some embodiments, the depth image capturing apparatus 20 can include a TOF depth camera 23. The processor 30 can be configured to perform the methods in 014, 015, and 016. In other words, the processor 30 can be configured to: obtain the number of regions of interest in the initial depth image; obtain initial depth data of the initial depth image; and obtain the target depth data corresponding to the number of regions of interest in the initial depth data.

In particular, the TOF depth camera 23 may include an infrared transmitter, an infrared receiver, and an infrared processing chip. The infrared processing chip is connected to the infrared transmitter and the infrared receiver, respectively. When the TOF depth camera 23 is configured to capture the initial depth image, the infrared transmitter emits infrared light at a specific wavelength (for example, 950 nm) within a predetermined distance in front of the electronic device 100, and the infrared light will be reflected back from the subject and received by the infrared receiver. The infrared processing chip obtain a phase difference or time difference between the emitted infrared light and the reflected infrared light to obtain the depth information of the subject, thereby obtaining the initial depth image. The infrared processing chip and the processor 30 may be the same element or two different elements.

In the embodiment of the present disclosure, each region of interest can be an image region in the initial depth image. The processor 30 can determine whether there is a region of interest from the initial depth image based on the depth information, and determine a position of the region of interest, i.e., a range of horizontal and vertical coordinates of pixels for the region of interest in the initial depth image. The processor 30 can obtain the initial depth data of the entire initial depth image. Finally, the processor 30 can search the initial depth data for the target depth data corresponding to the region of interest. It is to be noted that 014 and 015 can be performed in any order. For example, 014 can be performed before, after, or in parallel with 015.

Referring to FIGS. 3 and 9, in some embodiments, the depth image capturing apparatus 20 can include a structured light depth camera 24. The operation (i.e., 01) of obtaining the target depth data for the number of regions of interest of the initial depth image may include:

014: obtaining the number of regions of interest in the initial depth image;

015: obtaining initial depth data of the initial depth image; and

016: obtaining the target depth data corresponding to the number of regions of interest in the initial depth data.

Referring to FIG. 10, in some embodiments, the depth image capturing apparatus 20 can include a structured light depth camera 24. The first obtaining module 11 can include a fourth obtaining unit 114, a fifth obtaining unit 115, and a sixth obtaining unit 116. The fourth obtaining unit 114 can be configured to perform the method in 014, the fifth obtaining unit 115 can be configured to perform the method in 015, and the sixth obtaining unit 116 can be configured to perform the method in 016. The fourth obtaining unit 114 can be configured to obtain the number of regions of interest in the initial depth image. The fifth obtaining unit 115 can be configured to obtain initial depth data of the initial depth image. The sixth obtaining unit 116 can be configured to obtain the target depth data corresponding to the number of regions of interest in the initial depth data.

Referring to FIG. 3, in some embodiments, the depth image capturing apparatus 20 can include a structured light depth camera 24. The processor 30 can be configured to perform the methods in 014, 015, and 016. In other words, the processor 30 can be configured to: obtain the number of regions of interest in the initial depth image; obtain initial depth data of the initial depth image; and obtain the target depth data corresponding to the number of regions of interest in the initial depth data.

In particular, the structured light depth camera 24 may include a structured light projector, a structured light camera, and a structured light processing chip. The structured light processing chip is connected to the structured light projector and the structured light camera, respectively. The structured light camera may be an infrared light camera. When the structured light depth camera 24 is configured to capture the initial depth image, the structured light projector projects a laser pattern within a predetermined distance in front of the electronic device 100, and the structured light camera captures the laser pattern modulated by the subject. The structured light processing chip is configured to process the laser pattern to obtain the initial depth image. Here, the structured light processing chip and the processor 30 may be a same element or two different elements.

In the embodiment of the present disclosure, each region of interest can be an image region in the initial depth image. The processor 30 can determine whether there is a region of interest from the initial depth image based on the depth information, and determine a position of the region of interest, i.e., a range of horizontal and vertical coordinates of pixels for the region of interest in the initial depth image. The processor 30 can obtain the initial depth data of the entire initial depth image. Finally, the processor 30 can search the initial depth data for the target depth data corresponding to the region of interest. Again, 014 and 015 can be performed in any order. For example, 014 can be performed before, after, or in parallel with 015.

The depth image processing method according to the embodiment of the present disclosure can be applied in the binocular camera, the TOF depth camera 23, or the structured light depth camera 24, and thus has a wide range of applications.

Figure 11:
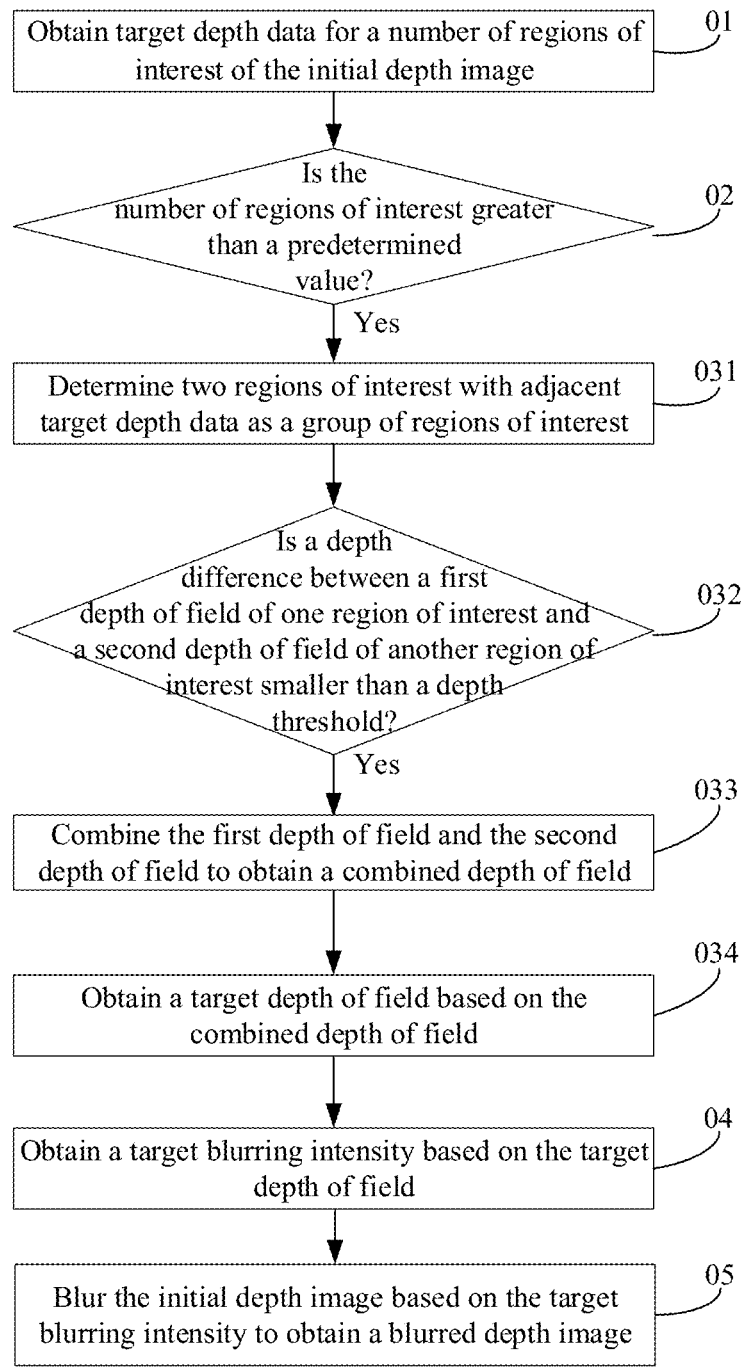
FIG. 11 is a flowchart illustrating a depth image processing method according to some embodiments of the present disclosure.

Referring to FIG. 11, in some embodiments, the operation (i.e., 03) of grouping the number of regions of interest based on the target depth data to obtain the target depth of field may include:

031: determining two regions of interest with adjacent target depth data as a group of regions of interest;

032: determining whether a depth difference between a first depth of field of one region of interest in the group of regions of interest and a second depth of field of another region of interest in the group of regions of interest is smaller than (or equal to) a depth threshold;

033: combining, in response to the depth difference being smaller than (or equal to) the depth threshold, the first depth of field and the second depth of field to obtain a combined depth of field; and

034: obtaining the target depth of field based on the combined depth of field.

Figure 12:
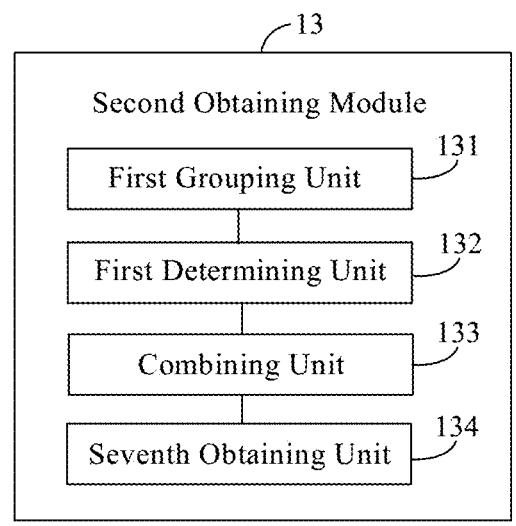
FIG. 12 is a block diagram of a second obtaining module according to some embodiments of the present disclosure.

Referring to FIG. 12, in some embodiments, the second obtaining module 13 can include a first grouping unit 131, a first determining unit 132, a combining unit 133, and a seventh obtaining unit 134. The first grouping unit 131 can be configured to perform the method in 031, the first determining unit 132 can be configured to perform the method in 032, the combining unit 133 can be configured to perform the method in 033, and the seventh obtaining unit 134 can be configured to perform the method in 034. In other words, the first grouping unit 131 can be configured to determine two regions of interest with adjacent target depth data as a group of regions of interest. The first determining unit 132 can be configured to determine whether a depth difference between a first depth of field of one region of interest in the group of regions of interest and a second depth of field of another region of interest in the group of regions of interest is smaller than (or equal to) a depth threshold. The combining unit 133 can be configured to combine, when the depth difference is smaller than (or equal to) the depth threshold, the first depth of field and the second depth of field to obtain a combined depth of field. The seventh obtaining unit 134 can be configured to obtain the target depth of field based on the combined depth of field.

Referring to FIG. 3, in some embodiments, the processor 30 may be configured to perform the methods in 031, 032, 033, and 034. That is, the processor 30 may be configured to: determine two regions of interest with adjacent target depth data as a group of regions of interest; determine whether a depth difference between a first depth of field of one region of interest in the group of regions of interest and a second depth of field of another region of interest in the group of regions of interest is smaller than (or equal to) a depth threshold; combine, in response to the depth difference being smaller than (or equal to) the depth threshold, the first depth of field and the second depth of field to obtain a combined depth of field; and obtain the target depth of field based on the combined depth of field.

Figure 13:
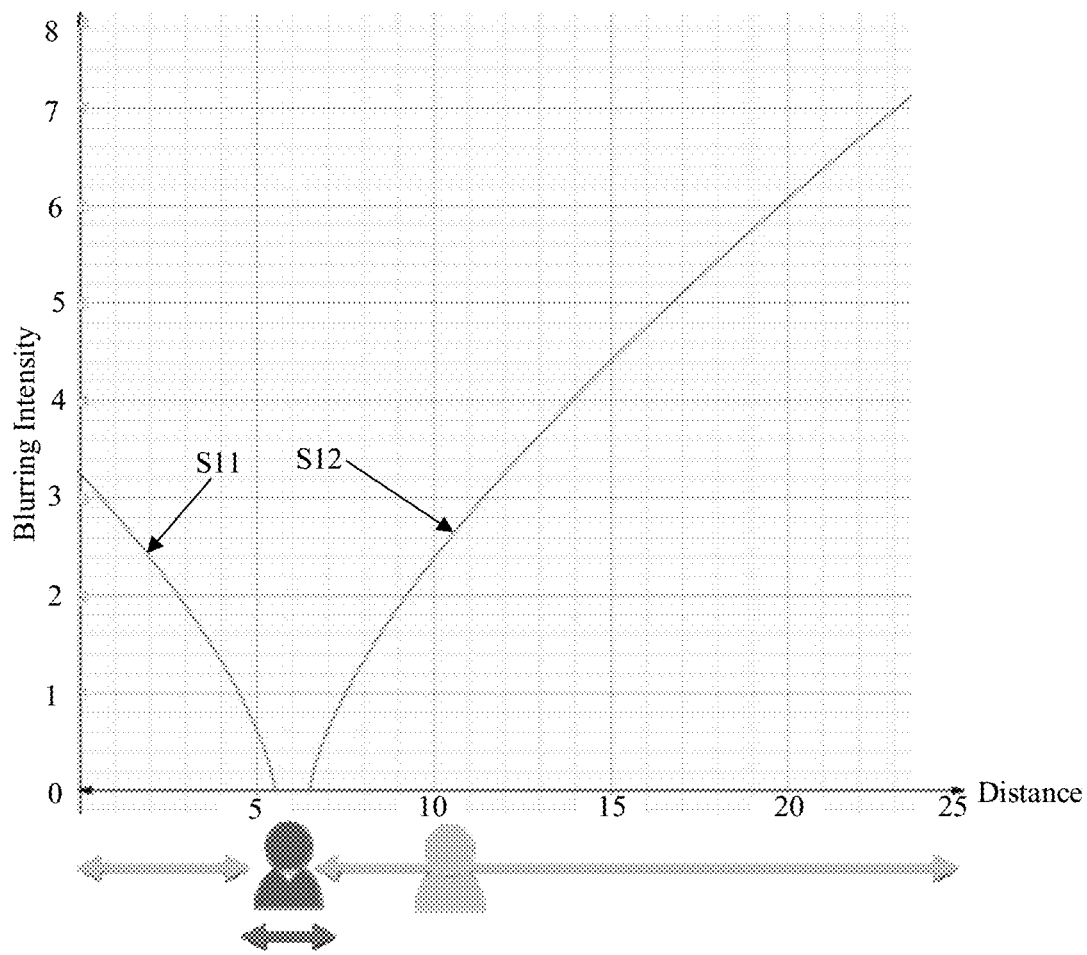
FIGS. 13 and 14 are schematic diagrams each illustrating a scenario for a depth image processing method according to some embodiments of the present disclosure.

In particular, taking FIG. 13 as an example, when two people are photographed, the number of regions of interest (i.e., portrait regions) is two. If the depth of field is determined directly based on the first region of interest as (5.5, 6.5), and the blurring intensity is further determined to be the curve represented by S11 and S12, then the parts (0, 5.5) and (6.5) outside the depth of field will be blurred. In other words, the second region of interest will also be blurred, resulting in poor user experience.

Figure 14:
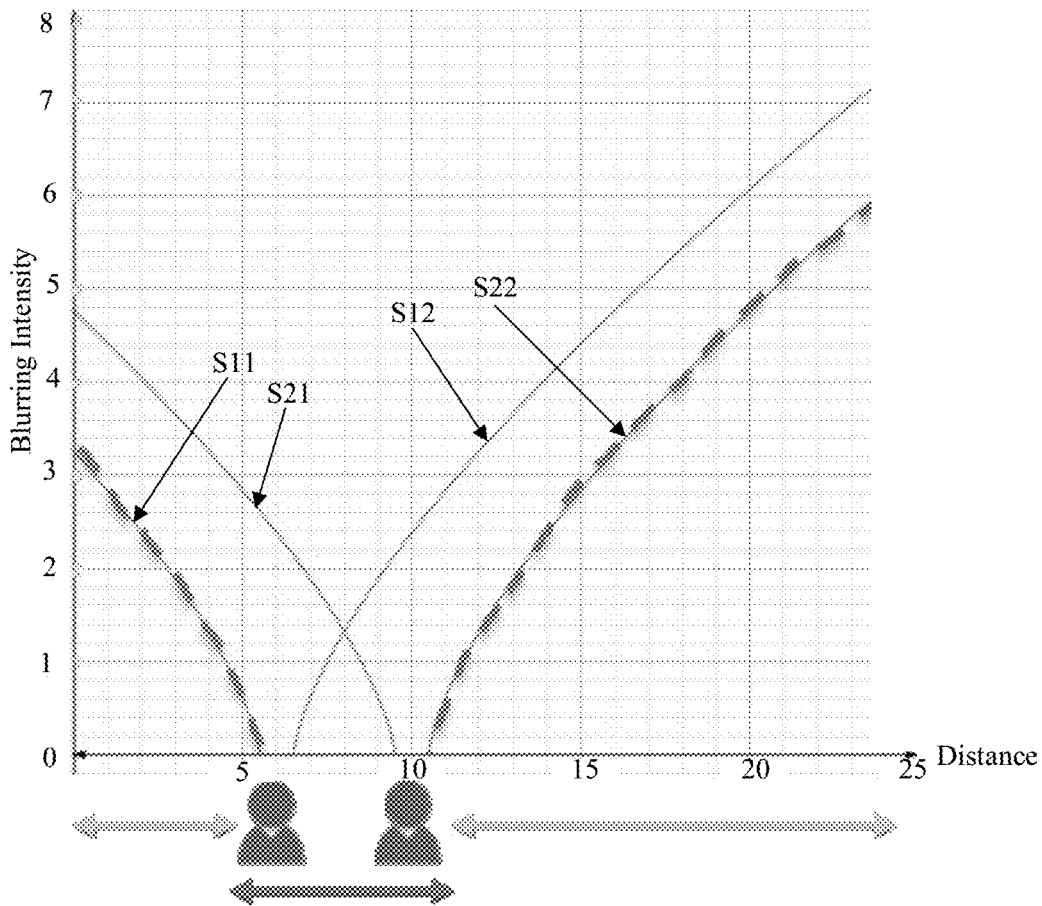

Referring to FIG. 14, in an embodiment of the present disclosure, the processor 30 first determines two regions of interest with adjacent target depth data as a group of regions of interest, that is, determining the first region of interest and the second region of interest as a group of regions of interest, and then determines whether the depth difference between the first depth of field (5.5, 6.5) of the first region of interest and the second depth of field (9.5, 10.5) of the second region of interest is smaller than (or equal to) the depth threshold. In response to the depth difference being smaller than (or equal to) the depth threshold, the first depth of field (5.5, 6.5) and the second depth of field (9.5, 10.5) are combined to obtain a combined depth of field, and the target depth of field is obtained based on the combined depth of field.

Figure 15:
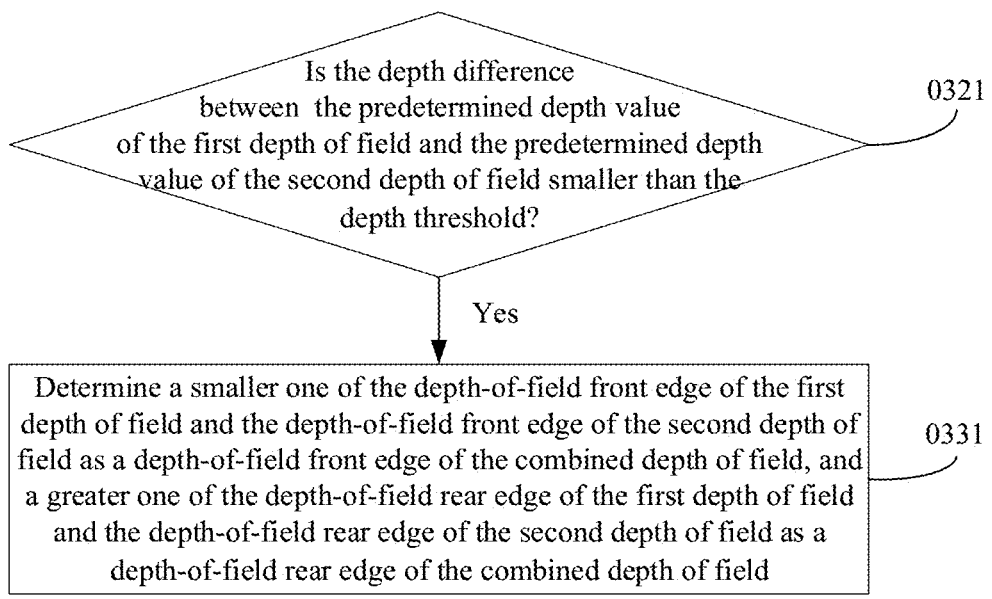
FIG. 15 is a flowchart illustrating a depth image processing method according to some embodiments of the present disclosure.

Referring to FIG. 15, in some embodiments, the first depth of field and the second depth of field may each include a depth-of-field front edge, a depth-of-field rear edge, and a predetermined depth value within a range between the depth-of-field front edge and the depth-of-field rear edge. The operation (i.e., 032) of determining whether the depth difference between the first depth of field of the one region of interest in the group of regions of interest and the second depth of field of the other region of interest in the group of regions of interest is smaller than (or equal to) the depth threshold may include:

0321: determining whether the depth difference between the predetermined depth value of the first depth of field and the predetermined depth value of the second depth of field is smaller than (or equal to) the depth threshold.

Figure 16:
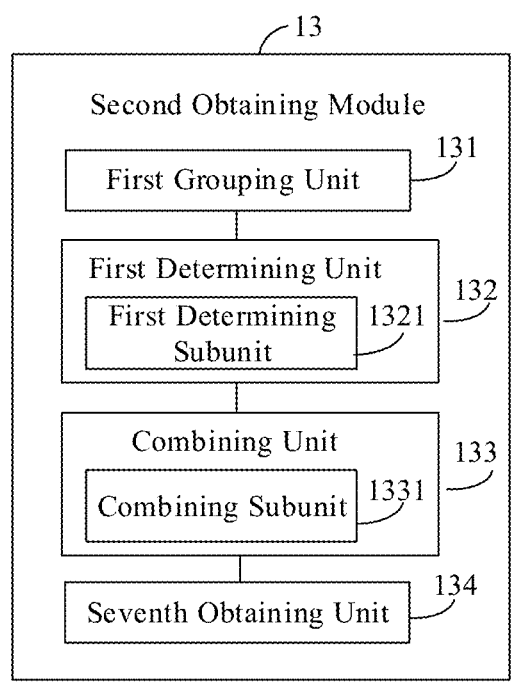
FIG. 16 is a block diagram of a second obtaining module according to some embodiments of the present disclosure.

Referring to FIG. 16, in some embodiments, the first depth of field and the second depth of field may each include a depth-of-field front edge, a depth-of-field rear edge, and a predetermined depth value within a range between the depth-of-field front edge and the depth-of-field rear edge. The first determining unit 132 can include a first determining subunit 1321. The first determining subunit 1321 can be configured to perform the method in 0321. In other words, the first determining subunit 1321 may be configured to determine whether the depth difference between the predetermined depth value of the first depth of field and the predetermined depth value of the second depth of field is smaller than (or equal to) the depth threshold.

Referring to FIG. 3, in some embodiments, the first depth of field and the second depth of field may each include a depth-of-field front edge, a depth-of-field rear edge, and a predetermined depth value within a range between the depth-of-field front edge and the depth-of-field rear edge. The processor 30 may be configured to perform the method in 0321. That is, the processor 30 may be configured to determine whether the depth difference between the predetermined depth value of the first depth of field and the predetermined depth value of the second depth of field is smaller than (or equal to) the depth threshold.

In particular, the depth-of-field front edge may be a depth value closest to the depth image capturing apparatus 20 in the range of the depth of field, and the depth-of-field rear edge may be a depth value furthest from the depth image capturing apparatus 20 in the range of the depth of field. Referring to FIG. 14 as an example, the depth-of-field front edge of the first depth of field (5.5, 6.5) is 5.5, the depth-of-field rear edge of the depth of field is 6.5, and the predetermined depth value is any depth value within the range of (5.5, 6.5). The depth-of-field front edge of the second depth of field (9.5, 10.5) is 9.5, the depth-of-field rear edge of the second depth of field is 10.5, and the predetermined depth value is any depth value within the range of (9.5, 10.5).

In response to the predetermined depth value of the first depth of field being selected as the depth-of-field rear edge of the first depth of field, and the predetermined depth value of the second depth of field is selected as the depth-of-field front edge of the second depth of field, the processor 30 can determine whether the depth difference between the first depth of field (5.5, 6.5) and the second depth of field (9.5, 10.5) is smaller than (or equal to) the depth threshold by determining the depth difference between the depth-of-field rear edge 6.5 of the first depth of field and the depth-of-field front edge 9.5 of the second depth of field is smaller than (or equal to) the depth threshold. Of course, each of the predetermined depth value of the first depth of field and the predetermined depth value of the second depth of field may alternatively be selected as any other depth value in the range from the depth-of-field front edge to the depth-of-field rear edge. For example, the predetermined depth value may be selected as the midpoint between the depth-of-field front edge and the depth-of-field rear edge.

Referring to FIG. 15, in some embodiments, the first depth of field and the second depth of field may each include a depth-of-field front edge, a depth-of-field rear edge, and a predetermined depth value within a range between the depth-of-field front edge and the depth-of-field rear edge. The operation (i.e., 033) of combining, in response to the depth difference being smaller than (or equal to) the depth threshold, the first depth of field and the second depth of field to obtain the combined depth of field may include:

0331: determining, in response to the depth difference being smaller than the depth threshold, a smaller one of the depth-of-field front edge of the first depth of field and the depth-of-field front edge of the second depth of field as a depth-of-field front edge of the combined depth of field, and a greater one of the depth-of-field rear edge of the first depth of field and the depth-of-field rear edge of the second depth of field as a depth-of-field rear edge of the combined depth of field.

Referring to FIG. 16, in some embodiments, the first depth of field and the second depth of field may each include a depth-of-field front edge, a depth-of-field rear edge, and a predetermined depth value within a range between the depth-of-field front edge and the depth-of-field rear edge. The combining unit 133 can include a combining subunit 1331. The combining subunit 1331 can be configured to perform the method in 0331. In other words, in response to the depth difference being smaller than (or equal to) the depth threshold, the combining subunit 1331 can be configured to determine a smaller one of the depth-of-field front edge of the first depth of field and the depth-of-field front edge of the second depth of field as a depth-of-field front edge of the combined depth of field, and a greater one of the depth-of-field rear edge of the first depth of field and the depth-of-field rear edge of the second depth of field as a depth-of-field rear edge of the combined depth of field.

Referring to FIG. 3, in some embodiments, the first depth of field and the second depth of field may each include a depth-of-field front edge, a depth-of-field rear edge, and a predetermined depth value within a range between the depth-of-field front edge and the depth-of-field rear edge. The processor 30 may be configured to perform the method in 0331. The processor 30 may be configured to determine, in response to the depth difference being smaller than (or equal to) the depth threshold, a smaller one of the depth-of-field front edge of the first depth of field and the depth-of-field front edge of the second depth of field as a depth-of-field front edge of the combined depth of field, and a greater one of the depth-of-field rear edge of the first depth of field and the depth-of-field rear edge of the second depth of field as a depth-of-field rear edge of the combined depth of field In particular, referring again to FIG. 14 as an example, if the predetermined depth value of the first depth of field is selected as the depth-of-field rear edge 6.5 of the first depth of field, the predetermined depth value of the second depth of field is selected as the front edge 9.5 of the second depth of field, and the depth threshold is set to 4, then the depth difference between the predetermined depth value of the first depth of field and the predetermined depth value of the second depth of field is smaller than the depth threshold, and the processor 30 can determine the smaller one of the depth-of-field front edge 5.5 of the first depth of field and the depth-of-field front edge 9.5 of the second depth of field, i.e., 5.5, as the depth-of-field front edge of the combined depth of field, and the larger one of the depth-of-field rear edge 6.5 of the first depth of field and the depth-of-field rear edge 10.5 of the second depth of field 10.5, i.e., 10.5, as the depth-of-field rear edge of the combined depth of field. In other words, the combined depth of field obtained based on the group of regions of interest is (5.5, 10.5), and then the processor 30 can obtain the target depth of field based on the combined depth of field (5.5, 10.5).

Figure 17:
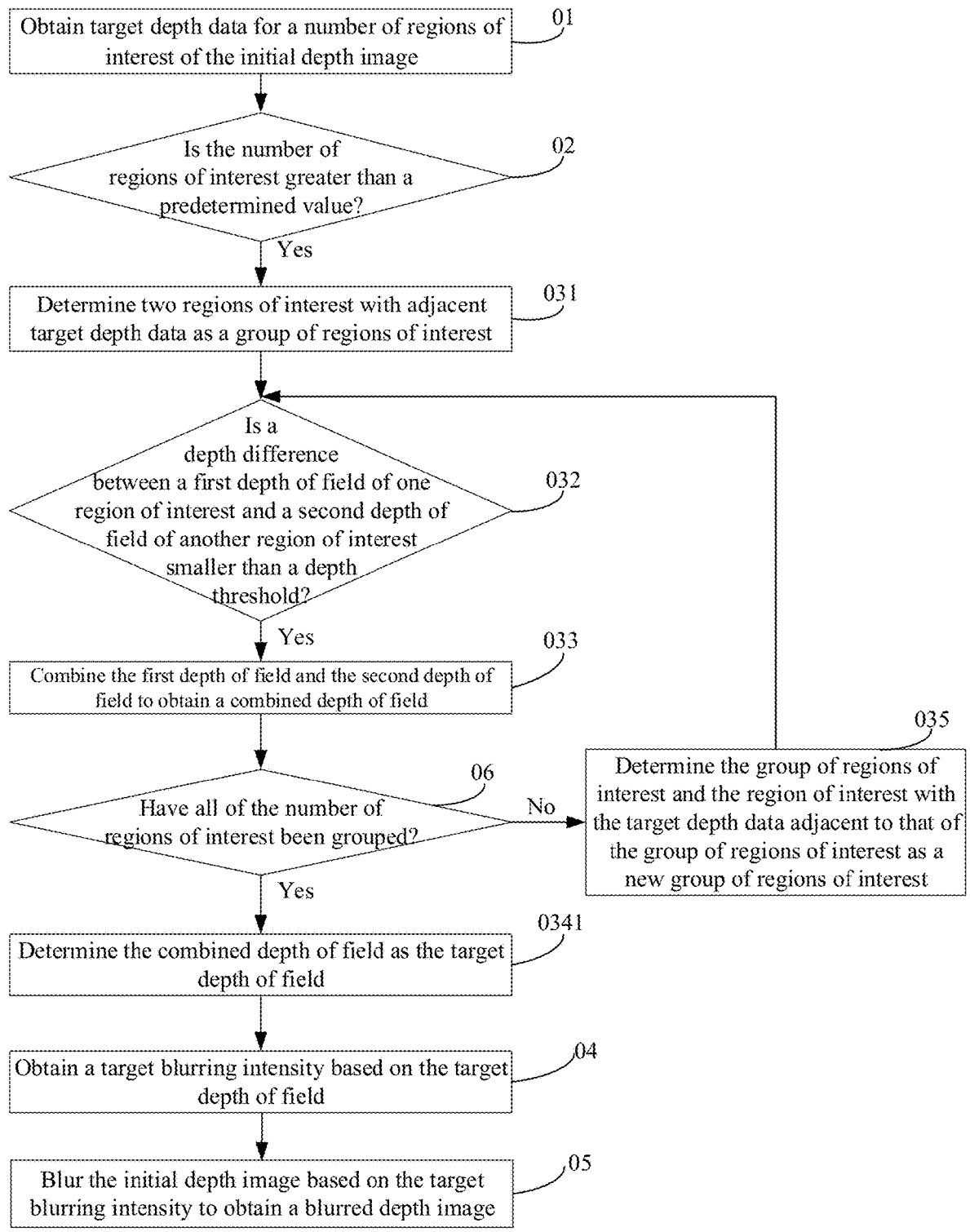
FIG. 17 is a flowchart illustrating a depth image processing method according to some embodiments of the present disclosure.

Referring to FIG. 17, in some embodiments, the depth image processing method may further include, subsequent to combining (i.e., 033) the first depth of field and the second depth of field to obtain the combined depth of field:

06: determining whether all of the number of regions of interest have been grouped.

The operation (i.e., 034) of obtaining the target depth of field based on the combined depth of field may include:

0341: determining, in response to all of the number of regions of interest having been grouped, the combined depth of field as the target depth of field.

The operation (i.e., 03) of grouping the number of regions of interest based on the target depth data to obtain the target depth of field further may further include:

035: determining, in response to there being any region of interest that has not been grouped, the group of regions of interest and the region of interest with the target depth data adjacent to that of the group of regions of interest as a new group of regions of interest.

Figure 18:
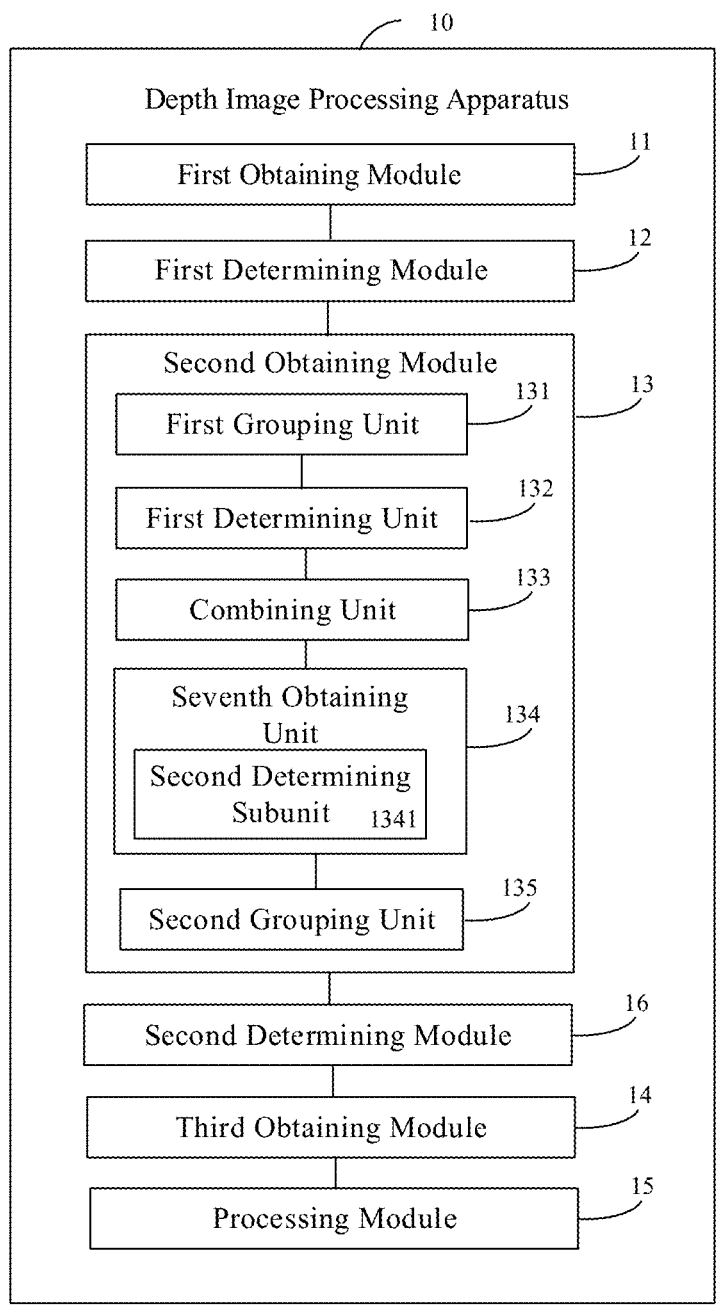
FIG. 18 is a block diagram of a depth image processing apparatus according to some embodiments of the present disclosure.

Referring to FIG. 18, in some embodiments, the depth image processing apparatus 10 can further include a second determining module 16. The seventh obtaining unit 134 can include a second determining subunit 1341. The second obtaining module 13 can include a second grouping unit 135. The second determining module 16 can be configured to perform the method in 06, the second determining subunit 1341 can be configured to perform the method in 0341, and the second grouping unit 135 can be configured to perform the method in 035. In other words, after combining the first depth of field and the second depth of field to obtain the combined depth of field, the second determining module 16 can be configured to determining whether all of the number of regions of interest have been grouped. The second determining subunit 1341 can be configured to determine, in response to all of the number of regions of interest having been grouped, the combined depth of field as the target depth of field. The second grouping unit 135 can be configured to determine, in response to there being any region of interest that has not been grouped, the group of regions of interest and the region of interest with the target depth data adjacent to that of the group of regions of interest as a new group of regions of interest.

Referring to FIG. 3, in some embodiments, the processor 30 may be configured to perform the methods in 06, 0341, and 035. In other words, after combining the first depth of field and the second depth of field to obtain the combined depth of field, the processor 30 may be configured to: determine whether all of the number of regions of interest have been grouped; determine, in response to all of the number of regions of interest having been grouped, the combined depth of field as the target depth of field; and determine, in response to there being any region of interest that has not been grouped, the group of regions of interest and the region of interest with the target depth data adjacent to that of the group of regions of interest as a new group of regions of interest.

In particular, after obtaining the combined depth of field (5.5, 10.5), the processor 30 can further determine whether all of the number of regions of interest have been grouped. For example, in FIG. 14, the number of regions of interest is two, and two regions of interest are grouped to obtain the target depth of field. In this case, the processor 30 can directly determine the combined depth of field (5.5, 10.5) as the target depth of field, that is, the target depth of field is also (5.5, 10.5). Then, the processor 30 can obtain the target blurring intensity based on the target depth of field (5.5, 10.5), and blur the initial depth image based on the target blurring intensity to obtain the blurred depth image. In FIG. 14, the target blurring intensity is the curve represented by S11 and S22. The processor 30 can perform gradual blurring on the image region in the range of (0, 5.5). In particular, as the depth value increases, the degree of blurring becomes lower. The processor 30 can keep the image region within the target depth of field (5.5, 10.5) clear. The processor 30 can also perform gradual blurring on the image region in the range of (10.5, +∞). In particular, as the depth value increases, the degree of blurring becomes higher.

When there is any region of interest that has not been grouped, for example, when the number of regions of interest is three and, with the above method, the combined depth of field is obtained, by grouping only the first region of interest and the second region of interest, as (5.5, 10.5), the processor 30 can then determine the group of regions of interest consisting of the first region of interest and the second region of interest as a new region of interest, and determine the new region of interest and the third region of interest as a new group of regions of interest. Assuming that the third depth of field of the third region of interest is (11.5, 13), the depth difference between the predetermined depth value 10.5 of the combined depth of field and the predetermined depth value 11.5 of the third depth of field is still smaller than the depth threshold 4, and the processor 30 can combine the depths of fields (5.5, 10.5) and (11.5, 13) to obtain a new combined depth of field of (5.5, 13), and then perform the process of determining whether all of the number of regions of interest have been grouped again, until all of the number of regions of interest have been grouped to obtain the target depth of field.

Figure 19:
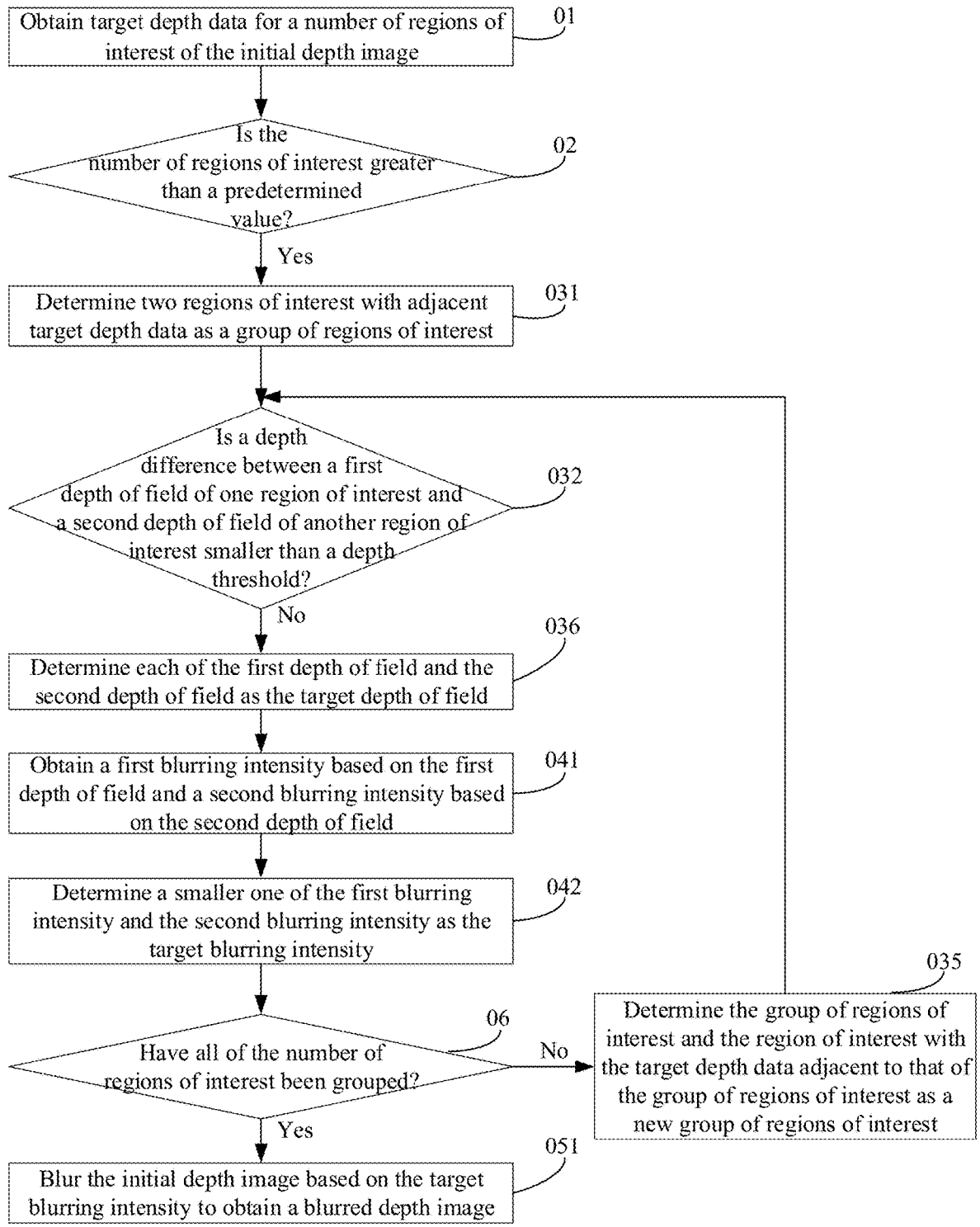
FIG. 19 is a flowchart illustrating a depth image processing method according to some embodiments of the present disclosure.

Referring to FIG. 19, in some embodiments, the operation (i.e., 03) of grouping the number of regions of interest based on the target depth data to obtain the target depth of field may further include:

036: determining, in response to the depth difference being greater than (or equal to) the depth threshold, each of the first depth of field and the second depth of field as the target depth of field.

The operation (i.e., 04) of obtaining the target blurring intensity based on the target depth of field may include:

041: obtaining a first blurring intensity based on the first depth of field and a second blurring intensity based on the second depth of field; and

042: determining a smaller one of the first blurring intensity and the second blurring intensity as the target blurring intensity.

Figure 20:
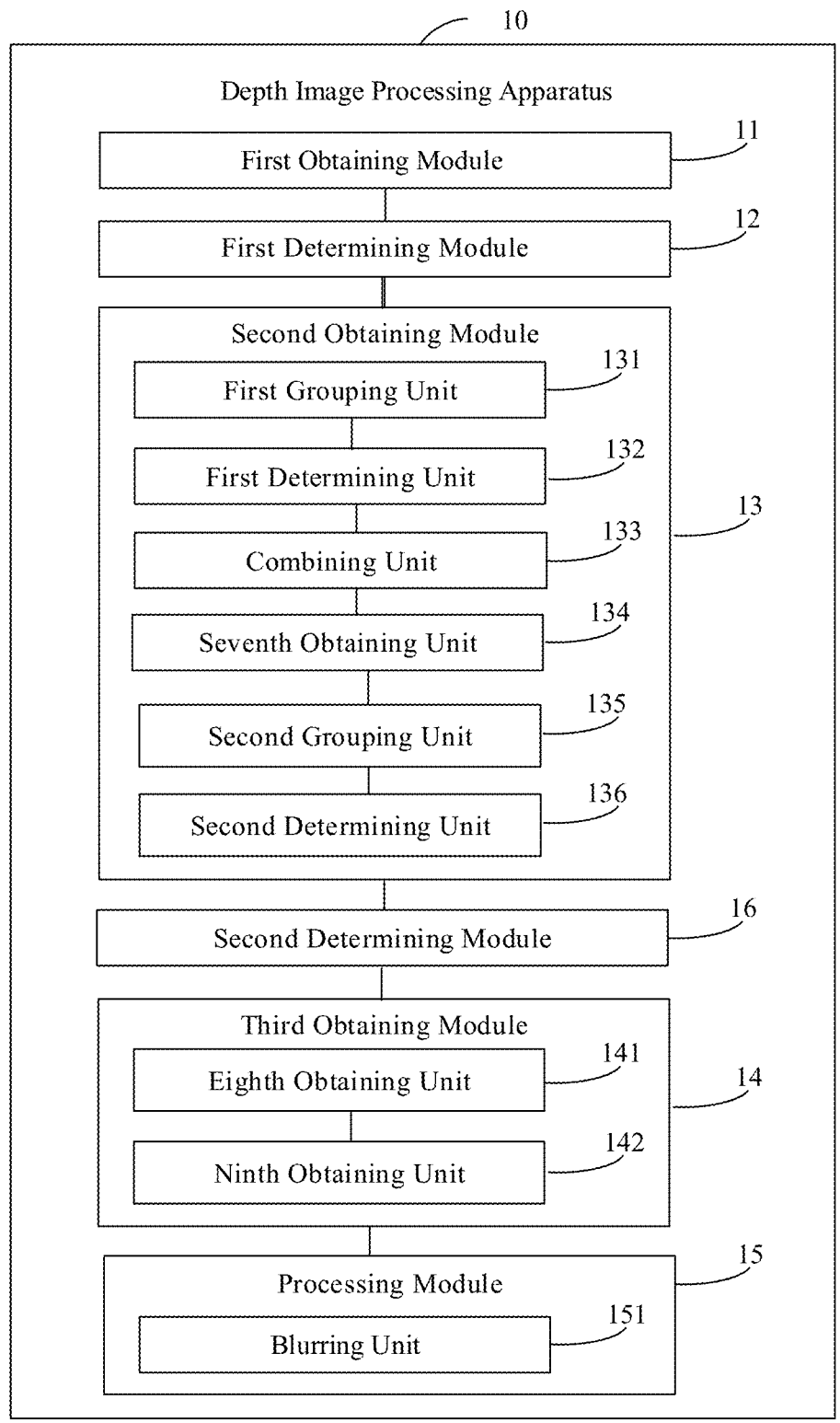
FIG. 20 is a block diagram of a depth image processing apparatus according to some embodiments of the present disclosure.

Referring to FIG. 20, in some embodiments, the second obtaining module 13 can further include a second determining unit 136. The third obtaining module 14 can include a eighth obtaining unit 141 and a ninth obtaining unit 142. The second determining unit 136 can be configured to perform the method in 036, the eighth obtaining unit 141 can be configured to perform the method in 041, and the ninth obtaining unit 142 can be configured to perform the method in 042. In other words, the second determining unit 136 may be configured to determine, in response to the depth difference being greater than (or equal to) the depth threshold, each of the first depth of field and the second depth of field as the target depth of field. The eighth obtaining unit 141 can be configured to obtain a first blurring intensity based on the first depth of field and a second blurring intensity based on the second depth of field. The ninth obtaining unit 142 can be configured to determine a smaller one of the first blurring intensity and the second blurring intensity as the target blurring intensity.

Referring to FIG. 3, in some embodiments, the processor 30 may be configured to perform the methods in 036, 041, and 042. That is, the processor 30 may be configured to: In response to the depth difference being greater than (or equal to) the depth threshold, determine, each of the first depth of field and the second depth of field as the target depth of field; obtain a first blurring intensity based on the first depth of field and a second blurring intensity based on the second depth of field; and determine a smaller one of the first blurring intensity and the second blurring intensity as the target blurring intensity.

Figure 21:
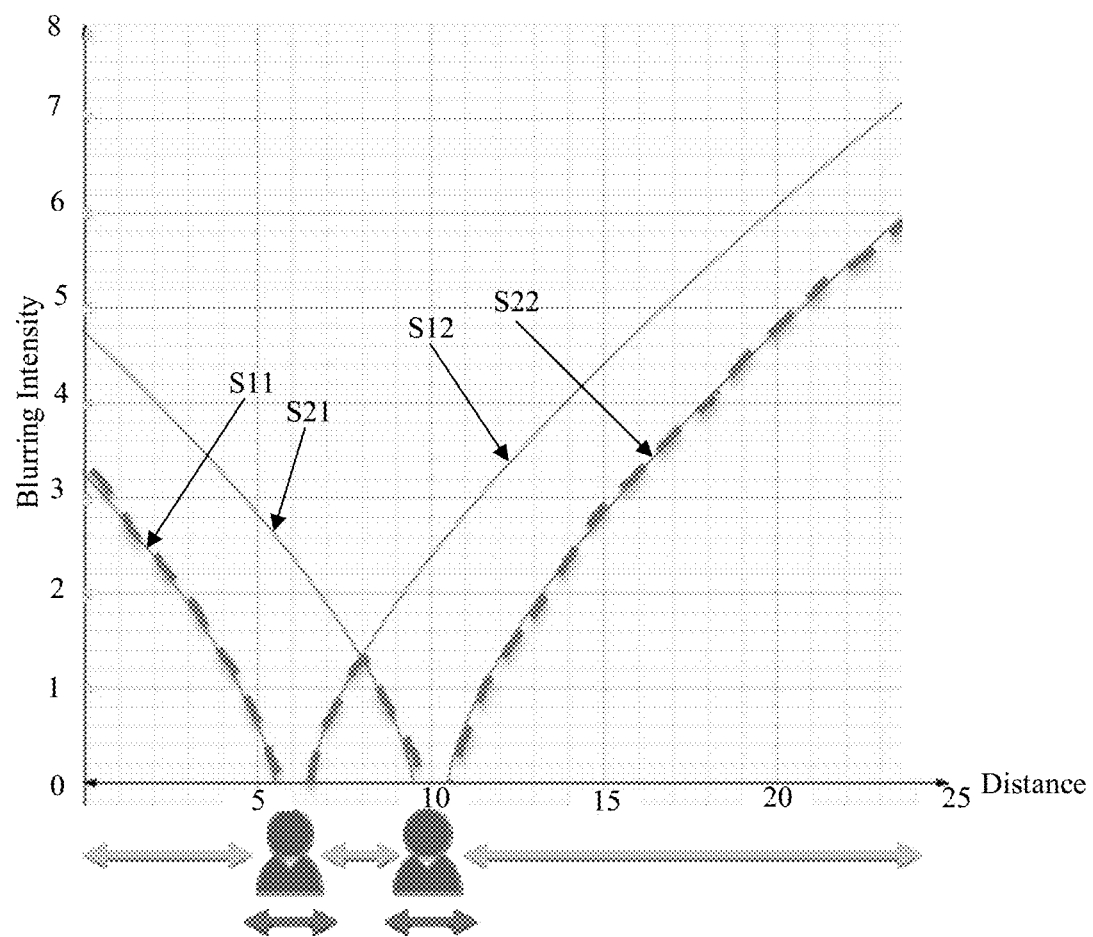
FIG. 21 is a schematic diagram illustrating a scenario for a depth image processing method according to some embodiments of the present disclosure.

In particular, referring to FIG. 21, if the predetermined depth value of the first depth of field is selected as the depth-of-field rear edge 6.5 of the first depth of field, the predetermined depth value of the second depth of field is selected as the depth-of-field front edge 9.5 of the second depth of field, and the depth threshold is set to 2, the depth difference between the predetermined depth value of the first depth of field and the predetermined depth value of the second depth of field is greater than the depth threshold, and the processor 30 can determine each of the first depth of field (5.5, 6.5) and the second depth of field (9.5, 10.5) as the target depth of field, and then obtain the first blurring intensity based on the first depth of field (5.5, 6.5) (the first blurring intensity can be the curve represented by S11 and S12) and obtain the second virtual intensity based on the second depth of field (9.5, 10.5) (the second blurring intensity can be the curve represented by S21 and S22). Finally, the processor 30 can determine the smaller one of the first blurring intensity and the second blurring intensity as the target blurring intensity, i.e., the curve represented by the dashed line in FIG. 21.

Referring to FIG. 19, in some embodiments, the depth image processing method may further include, subsequent to determining (i.e., 042) the smaller one of the first blurring intensity and the second blurring intensity as the target blurring intensity:

06: determining whether all of the number of regions of interest have been grouped.

The operation (i.e., 05) of blurring the initial depth image based on the target blurring intensity to obtain the blurred depth image may include:

051: blurring, in response to all of the number of regions of interest having been grouped, the initial depth image based on the target blurring intensity to obtain the blurred depth image.

The operation (i.e., 03) of grouping the number of regions of interest based on the target depth data to obtain the target depth of field may further include:

035: determining, in response to there being any region of interest that has not been grouped, the group of regions of interest and the region of interest with the target depth data adjacent to that of the group of regions of interest as a new group of regions of interest.

Referring to FIG. 20, in some embodiments, the depth image processing apparatus 10 can further include a second determining module 16. The processing module 15 can include a blurring unit 151. The second obtaining module 13 can include a second grouping unit 135. The second determining module 16 can be configured to perform the method in 06, the blurring unit 151 can be configured to perform the method in 051, and the second grouping unit 135 can be configured to perform the method in 035. In other words, after determining the smaller one of the first blurring intensity and the second blurring intensity as the target blurring intensity, the second determining module 16 can be configured to determine whether all of the number of regions of interest have been grouped. The blurring unit 151 can be configured to blur, in response to all of the number of regions of interest having been grouped, the initial depth image based on the target blurring intensity to obtain the blurred depth image. The second grouping unit 135 can be configured to determine, in response to there being any region of interest that has not been grouped, the group of regions of interest and the region of interest with the target depth data adjacent to that of the group of regions of interest as a new group of regions of interest.

Referring to FIG. 3, in some embodiments, the processor 30 may be configured to perform the methods in 06, 051, and 035. In other words, after determining the smaller one of the first blurring intensity and the second blurring intensity as the target blurring intensity, the processor 30 may be configured to: determine whether all of the number of regions of interest have been grouped; blur, in response to all of the number of regions of interest having been grouped, the initial depth image based on the target blurring intensity to obtain the blurred depth image, and determine, in response to there being any region of interest that has not been grouped, the group of regions of interest and the region of interest with the target depth data adjacent to that of the group of regions of interest as a new group of regions of interest.

In particular, after obtaining the target blurring intensity, the processor 30 can further determine whether all of the number of regions of interest have been grouped. For example, in FIG. 21, the number of regions of interest is two, and both regions of interest have been grouped to obtain the target depth of field. In this case, the processor 30 can directly blur the initial depth image based on the target blurring intensity to obtain the blurred depth image. The processor 30 can perform gradual blurring on the image region in the range of (0, 5.5). In particular, as the depth value increases, the degree of blurring becomes lower. The processor 30 can keep the image region in the target depth of field (5.5, 6.5) clear. The processor 30 can perform gradual blurring on the image region in the range of (6.5, 8) and (8, 9.5). In particular, in the range of (6.5, 8), as the depth value increases, the degree of blurring becomes higher. In the range of (8, 9.5), as the depth value increases, the degree of blurring becomes lower. The processor 30 can keep the image region in the target depth of field (9.5, 10.5) clear. The processor 30 can further perform gradual blurring on the image region in the range of (10.5, +∞). As the depth value increases, the degree of blurring becomes higher.

In response to there being any region of interest that has not been grouped, for example, in response to the number of regions of interest being three and, with the above method, the target blurring intensity is obtained based only on the first region of interest and the second region of interest, the processor 30 can further determine the group of regions of interest consisting of the first region of interest and the second region of interest as a new region of interest, and determine the new region of interest and the third region of interest as a new group of regions of interest. Assuming that the third depth of field of the third region of interest is (11.5, 13), and the depth difference between the predetermined depth value 10.5 of the depth of field (5.5, 6.5), (9.5, 10.5) of the new region of interest and the predetermined depth value 11.5 of the third depth of field is smaller than the depth threshold 2, the processor 30 can combine the depth of field (9.5, 10.5) and the third depth of field (11.5, 13), and finally the processor 30 can keep the image regions in the ranges of (5.5, 6.5) and (9.5, 13) clear. The processor 30 can keep determining whether all of the number of regions of interest have been grouped, until all of the number of regions of interest have been grouped to obtain the target depth of field.

It can be appreciated that, with the above method for image processing, no matter whether the depth difference is greater than (or equal to) the depth threshold, or the depth difference is smaller than (or equal to) the depth threshold, it is possible to effectively ensure the clarity of each region of interest, such that the user can have a better photographing experience. In addition, in the embodiments of the present disclosure, in response to the depth threshold being set to be large enough, for example, larger than the difference between the maximum depth value and the minimum depth value in the entire initial depth image, the processor 30 can achieve a full focus of the entire initial depth image without blurring the initial depth image.

What is claimed is:

1. A depth image processing method, applied in an electronic device comprising a depth image capturing apparatus configured to capture an initial depth image, the depth image processing method comprising:
   obtaining target depth data for a number of regions of interest of the initial depth image;
   grouping, in response to the number of regions of interest being greater than a predetermined value, the number of regions of interest based on the target depth data to obtain a target depth of field;
   obtaining a target blurring intensity based on the target depth of field; and
   blurring the initial depth image based on the target blurring intensity to obtain a blurred depth image,
   wherein the grouping the number of regions of interest based on the target depth data to obtain the target depth of field comprises:
   determining two regions of interest with adjacent target depth data as a group of regions of interest;
   determining whether a depth difference between a first depth of field of one region of interest in the group of regions of interest and a second depth of field of another region of interest in the group of regions of interest is smaller than a depth threshold;
   combining, in response to the depth difference being smaller than the depth threshold, the first depth of field and the second depth of field to obtain a combined depth of field; and
   obtaining the target depth of field based on the combined depth of field,
   wherein the grouping the number of regions of interest based on the target depth data to obtain the target depth of field further comprises:
   determining, in response to the depth difference being greater than the depth threshold, each of the first depth of field and the second depth of field as the target depth of field, and
   the obtaining target blurring intensity based on the target depth of field comprises:
   obtaining a first blurring intensity based on the first depth of field and a second blurring intensity based on the second depth of field; and
   determining a smaller one of the first blurring intensity and the second blurring intensity as the target blurring intensity,
   wherein the depth image processing method further comprises, subsequent to determining the smaller one of the first blurring intensity and the second blurring intensity as the target blurring intensity:
   determining whether all of the number of regions of interest have been grouped,
   wherein the blurring the initial depth image based on the target blurring intensity to obtain the blurred depth image comprises:
   blurring, in response to all of the number of regions of interest having been grouped, the initial depth image based on the target blurring intensity to obtain the blurred depth image, and
   wherein the grouping the number of regions of interest based on the target depth data to obtain the target depth of field further comprises:
   determining, in response to there being any region of interest that has not been grouped, the group of regions of interest and the region of interest with the target depth data adjacent to that of the group of regions of interest as a new group of regions of interest.

2. The depth image processing method of claim 1, wherein the depth image capturing apparatus comprises a first camera configured to capture a first image and a second camera configured to capture a second image, the first image and the second image being combined to form the initial depth image, and the obtaining the target depth data for the number of regions of interest of the initial depth image comprises:
   obtaining the number of regions of interest in the first image or the second image;
   obtaining initial depth data of the initial depth image; and
   obtaining the target depth data corresponding to the number of regions of interest in the initial depth data.

3. The depth image processing method of claim 1, wherein the depth image capturing apparatus comprises a Time-of-Flight (TOF) depth camera or a structured light depth camera, and the obtaining the target depth data for the number of regions of interest of the initial depth image comprises:
   obtaining the number of regions of interest in the initial depth image;
   obtaining initial depth data of the initial depth image; and
   obtaining the target depth data corresponding to the number of regions of interest in the initial depth data.

4. The depth image processing method of claim 1, wherein the predetermined value is 1.

5. The depth image processing method of claim 1, wherein the first depth of field and the second depth of field each comprise a depth-of-field front edge, a depth-of-field rear edge, and a predetermined depth value within a range between the depth-of-field front edge and the depth-of-field rear edge, and the determining whether the depth difference between the first depth of field of the one region of interest in the group of regions of interest and the second depth of field of the other region of interest in the group of regions of interest is smaller than the depth threshold comprises:
   determining whether the depth difference between the predetermined depth value of the first depth of field and the predetermined depth value of the second depth of field is smaller than the depth threshold.

6. The depth image processing method of claim 1, wherein the first depth of field and the second depth of field each comprise a depth-of-field front edge, a depth-of-field rear edge, and a predetermined depth value within a range between the depth-of-field front edge and the depth-of-field rear edge, and the combining, in response to the depth difference being smaller than the depth threshold, the first depth of field and the second depth of field to obtain the combined depth of field comprises:
determining, in response to the depth difference being smaller than the depth threshold, a smaller one of the depth-of-field front edge of the first depth of field and the depth-of-field front edge of the second depth of field as a depth-of-field front edge of the combined depth of field, and a greater one of the depth-of-field rear edge of the first depth of field and the depth-of-field rear edge of the second depth of field as a depth-of-field rear edge of the combined depth of field.

7. The depth image processing method of claim 1, further comprising, subsequent to combining the first depth of field and the second depth of field to obtain the combined depth of field:
determining whether all of the number of regions of interest have been grouped,
wherein the obtaining the target depth of field based on the combined depth of field comprises:
determining, in response to all of the number of regions of interest having been grouped, the combined depth of field as the target depth of field, and
wherein the grouping the number of regions of interest based on the target depth data to obtain the target depth of field further comprises:
determining, in response to there being any region of interest that has not been grouped, the group of regions of interest and the region of interest with the target depth data adjacent to that of the group of regions of interest as a new group of regions of interest.

8. An electronic device, comprising a depth image capturing apparatus configured to capture an initial depth image and a processor configured to:
obtain target depth data for a number of regions of interest of the initial depth image;
group, in response to the number of regions of interest being greater than a predetermined value, the number of regions of interest based on the target depth data to obtain a target depth of field;
obtain a target blurring intensity based on the target depth of field; and
blur the initial depth image based on the target blurring intensity to obtain a blurred depth image,
wherein the processor is further configured to:
determine two regions of interest with adjacent target depth data as a group of regions of interest;
determine whether a depth difference between a first depth of field of one region of interest in the group of regions of interest and a second depth of field of another region of interest in the group of regions of interest is smaller than a depth threshold;
combine, in response to the depth difference being smaller than the depth threshold, the first depth of field and the second depth of field to obtain a combined depth of field; and
obtain the target depth of field based on the combined depth of field, wherein the processor is further configured to:
determine, in response to the depth difference being greater than the depth threshold, each of the first depth of field and the second depth of field as the target depth of field;
obtain a first blurring intensity based on the first depth of field and a second blurring intensity based on the second depth of field; and
determine a smaller one of the first blurring intensity and the second blurring intensity as the target blurring intensity,
wherein the processor is further configured to, subsequent to determining the smaller one of the first blurring intensity and the second blurring intensity as the target blurring intensity:
determine whether all of the number of regions of interest have been grouped;
blur, in response to all of the number of regions of interest having been grouped, the initial depth image based on the target blurring intensity to obtain the blurred depth image; and
determine, in response to there being any region of interest that has not been grouped, the group of regions of interest and the region of interest with the target depth data adjacent to that of the group of regions of interest as a new group of regions of interest.

9. The electronic device of claim 8, wherein the depth image capturing apparatus comprises a first camera configured to capture a first image and a second camera configured to capture a second image, the first image and the second image being combined to form the initial depth image, and wherein the processor is further configured to:
obtain the number of regions of interest in the first image or the second image;
obtain initial depth data of the initial depth image; and
obtain the target depth data corresponding to the number of regions of interest in the initial depth data.

10. The electronic device of claim 8, wherein the depth image capturing apparatus comprises a Time-of-Flight (TOF) depth camera or a structured light depth camera, and the processor is further configured to:
obtain the number of regions of interest in the initial depth image;
obtain initial depth data of the initial depth image; and
obtain the target depth data corresponding to the number of regions of interest in the initial depth data.

11. The electronic device of claim 8, wherein the first depth of field and the second depth of field each comprise a depth-of-field front edge, a depth-of-field rear edge, and a predetermined depth value within a range between the depth-of-field front edge and the depth-of-field rear edge, and the processor is further configured to:
determine whether the depth difference between the predetermined depth value of the first depth of field and the predetermined depth value of the second depth of field is smaller than the depth threshold.

12. The electronic device of claim 8, wherein the first depth of field and the second depth of field each comprise a depth-of-field front edge, a depth-of-field rear edge, and a predetermined depth value within a range between the depth-of-field front edge and the depth-of-field rear edge, and the processor is further configured to:
determine, in response to the depth difference being smaller than the depth threshold, a smaller one of the depth-of-field front edge of the first depth of field and the depth-of-field front edge of the second depth of field as a depth-of-field front edge of the combined depth of field, and a greater one of the depth-of-field rear edge of the first depth of field and the depth-of-field rear edge of the second depth of field as a depth-of-field rear edge of the combined depth of field.

13. The electronic device of claim 8, wherein the processor is further configured to, subsequent to combining the first depth of field and the second depth of field to obtain the combined depth of field:
   determine whether all of the number of regions of interest have been grouped;
   determine, in response to all of the number of regions of interest having been grouped, the combined depth of field as the target depth of field; and
   determine, in response to there being any region of interest that has not been grouped, the group of regions of interest and the region of interest with the target depth data adjacent to that of the group of regions of interest as a new group of regions of interest.

14. A non-transitory computer-readable storage medium having a computer program stored thereon, wherein the program, in response to being executed by a processor, implements the depth image processing method according to claim 1.

\* \* \* \* \*